United States Patent [19]
Wang

[11] Patent Number: 5,631,449
[45] Date of Patent: May 20, 1997

[54] AUDIO TRANSMISSION DEVICE FOR MOUNTING IN A MONITOR OF A COMPUTER SYSTEM

[75] Inventor: Wen-Pin Wang, Taoyuan, Taiwan

[73] Assignee: Delta Electronics, Inc., Taoyuan, Taiwan

[21] Appl. No.: 555,862

[22] Filed: Nov. 13, 1995

[51] Int. Cl.$^6$ ................................. H05K 5/00
[52] U.S. Cl. ....................................... 181/141
[58] Field of Search ............................. 181/141, 152, 181/156, 199; 381/154, 156, 159

[56] References Cited

U.S. PATENT DOCUMENTS

| | | | |
|---|---|---|---|
| 5,440,645 | 8/1995 | Freadman | 181/199 X |
| 5,455,867 | 10/1995 | Inoue et al. | 181/199 X |

*Primary Examiner*—Khanh Dang

[57] ABSTRACT

Disclosed is an audio transmission device for mounting in a monitor of a computer system and including a pair of symmetric frameworks mounted behind a front frame of the monitor at two lower or upper corners thereof so that a distance left between the pair of frameworks is about a width of a system board disposed inside the monitor. The framework each further includes a fixing arm formed at an inner side with a longitudinal groove which has a width slightly larger than a thickness of the system board to clamp the same between the pair of frameworks, a connecting arm extended from one side of the fixing arm, a resonant cabinet connected to the fixing arm via the connecting arm, and shock-absorbing arms extended from two side walls of the resonant cabinet for locking to the front frame of the monitor. The resonant cabinet is partitioned inside it to form a high-tone and a low-tone guide paths. The high-tone guide path is formed at a base portion with supporting grooves for a speaker to mount thereon. The fixing arm each is provided at an extended end with locating device to engage with a fixed point provided behind the front frame of the monitor and thereby fixing the framework to the front frame.

4 Claims, 4 Drawing Sheets

AUDIO TRANSMISSION DEVICE FOR MOUNTING IN A MONITOR OF A COMPUTER SYSTEM

BACKGROUND OF THE INVENTION

1. Field of the Invention

The present invention relates to an audio transmission device for mounting in a monitor of a computer system, and more particularly to a symmetrical framework pair which associate resonant cabinets with a system board in a monitor of a computer so as to provide the computer with good audio effect.

2. Description of the Prior Art

A conventional monitor of a computer system provides only the function of displaying images. Speakers for audio purpose must be disposed externally and connected to the monitor by means of wires. This adversely affects the integrity of the whole computer system while the multiple wires tend to cause a disordered working environment.

Generally speaking, the disadvantages of the conventional monitor with externally connected speakers include:

1. Following an increasingly grown need of general consumers for a better combined audio-video effect provided by a monitor when using a computer, the externally disposed speakers are not able to satisfy such requirement.
2. The wires for connecting the external speakers to the monitor shall expose the connection thereof to the surroundings which has adverse influence on the whole beautiful appearance and integrity of the computer system.

In view of the above-mentioned disadvantages existed in the conventional monitor of a computer system, the inventor has developed an audio transmission device for mounting in the monitor of a computer system.

SUMMARY OF THE INVENTION

It is therefore a primary object of the present invention to provide an audio transmission device for mounting in a monitor of a computer system. With this audio transmission device, speakers and a system board of the computer can be mounted in the monitor of the computer at the same time to provide the computer with a complete audio effect along with the video image.

Another object of the present invention is to provide an audio transmission device for mounting in a monitor of a computer system so that the system board and the speakers may be successfully connected to the monitor without the need of external wires, permitting the computer system to have more complete functions and simplified hardware structure which facilitates the transportation of the whole computer system.

A further object of the present invention is to provide an audio transmission device for mounting in a monitor of a computer system, wherein two cabinets instead of two frames are included to accommodate speakers therein, so as to provide a better resonant effect and accordingly a better audio effect.

A still further object of the present invention is to provide an audio transmission device for mounting in a monitor of a computer system, wherein shock-absorbing arms extended from the speaker resonant cabinets are provided to connect the cabinets to a front frame of the monitor so that any vibration of the monitor caused by any outcoming force can be absorbed by the shock-absorbing arms to stabilize the image displayed on the monitor.

BRIEF DESCRIPTION OF THE DRAWINGS

The detailed structure, functions, and performance of the present invention can be best understood through the following detailed description of the preferred embodiment and the accompanying drawings, wherein.

DETAILED DESCRIPTION OF THE PREFERRED EMBODIMENTS

Figure 1:
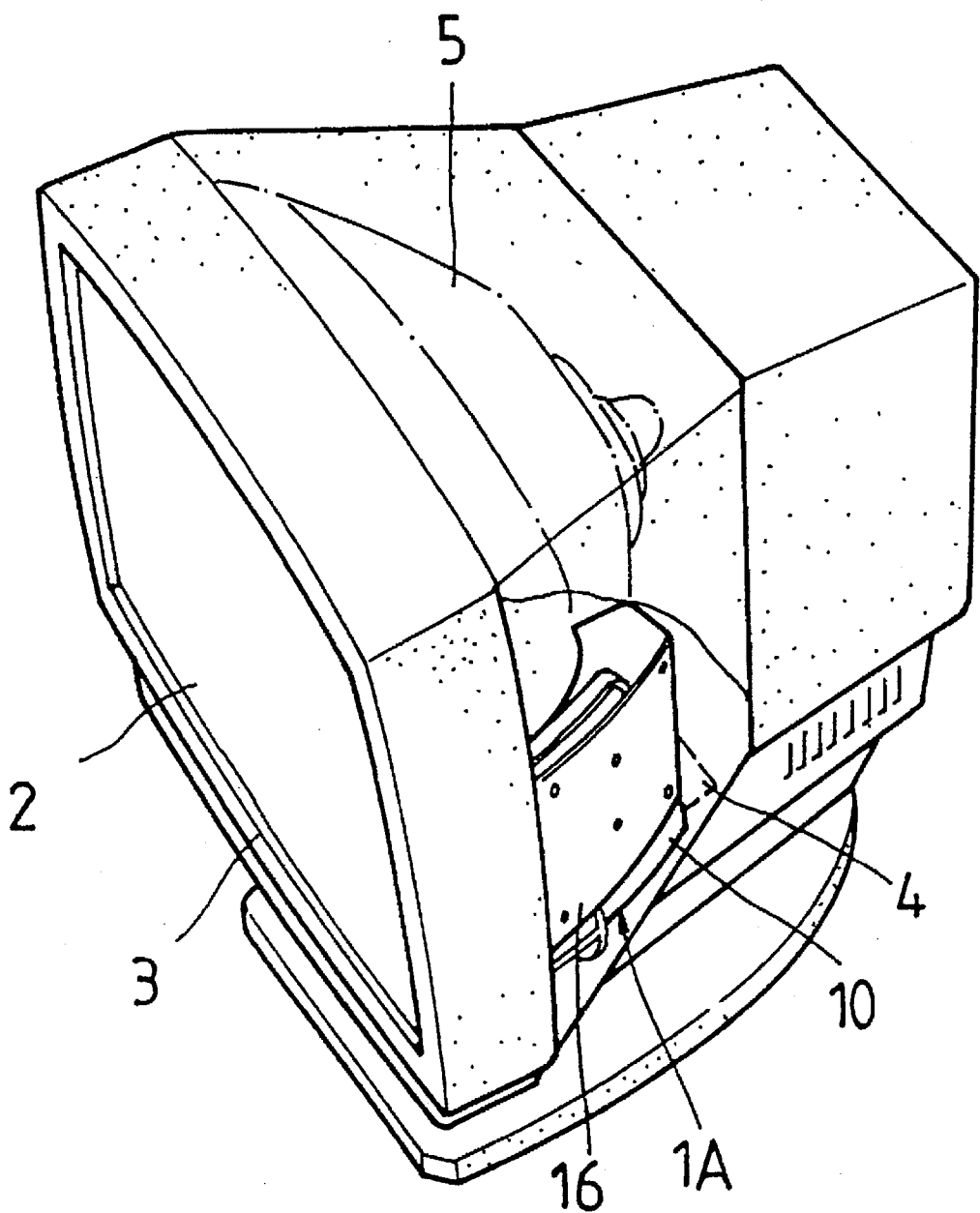
FIG. 1 is a perspective showing a computer monitor equipped with the audio transmission device according to the present invention, wherein a part of the figure is cut away to better show the mounting position of the device in the monitor.

Please refer to the drawings, particularly to FIG. 1, the present invention relates to an audio transmission device for mounting in a computer monitor. The device includes two symmetrical frameworks 1A, 1B separately mounted to two lower or upper corners behind a front frame 3 of the computer monitor 2. Since the frameworks 1A and 1B have similar structure, only the framework 1A shall be described hereinafter.

The framework 1A mainly includes a fixing arm 10 extending in a horizontal direction in the monitor and having a groove 13 formed and extending along an inner side thereof to receive a lateral edge of a system board 4 therein, and a resonant cabinet 16 having a profile for fitly contacting a sidewall of a display tube 5 in the monitor 2 for speakers 21 to mount therein. The system board 4 and the resonant cabinets 16 are connected to and behind the front frame 3 of the monitor 2 via the fixing arms 10 and be covered in a rear housing 6 of the monitor 2, allowing the monitor to be a compact body to provide the video image and the audio effect at the same time.

Figure 2:
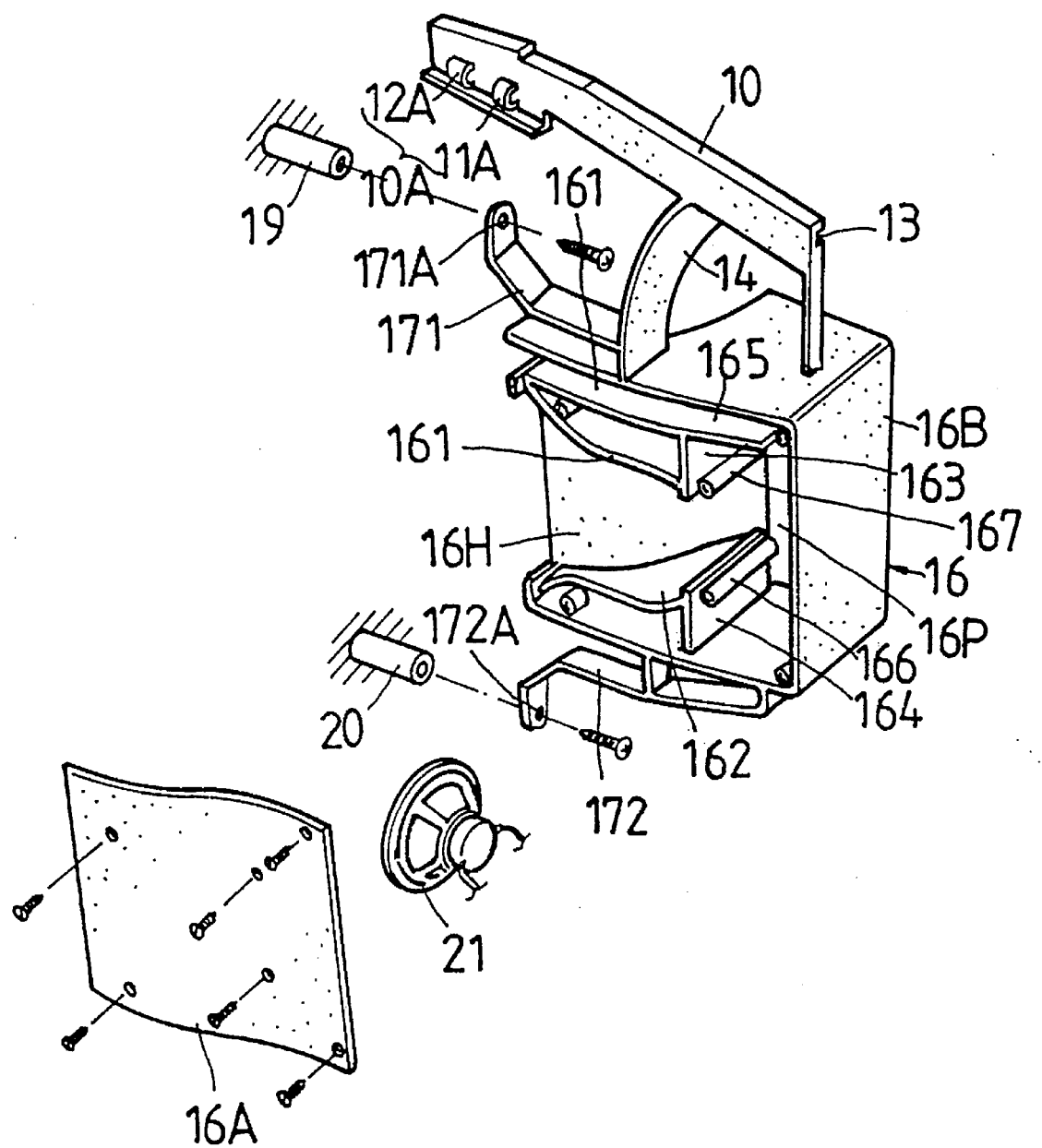
FIG. 2 is a disassembled perspective of one of the frameworks of the present invention.

Please refer to FIG. 2, in which one of the frameworks of the present invention for mounting to the back right side of the monitor 2, that is, framework 1A, is shown in a disassembled perspective. The framework 1A includes a fixing arm 10, a set of locating means 10A, a connecting arm 14, and a resonant cabinet 16. The locating means 10A is located at an extended end portion of the fixing arm 10 and further includes a first sleeve member 11A and a second sleeve member 12A sequentially provided along a longitudinal axis of the fixing arm 10 for receiving therein a fixing pin projecting from the front frame 3 of the monitor 2. As mentioned above, the fixing arm 10 is provided at an inner side with a groove 13 for engaging with the system board 4. The groove 13 has a width slightly bigger than a thickness of the system board 4, allowing the system board 4 to slidably move between two grooves 13 of the fixing arms 1A and 1B. The connecting arm 14 extends between the fixing arm 10 and the resonant cabinet 16, permitting the two latter elements to form an integral body. The resonant cabinet 16 consists of a cover member 16A and a box member 16B. The cover member 16A is in the form of a flat plate and is removably attached to the box member 16B by fastening means. The box member 16B is provided inside it with partitions 161, 162, 163, 164, and 165 to form several spaces, namely, a speaker compartment 16P, a high-tone guide path 16H, a low-tone guide path 16L, etc. The whole resonant cabinet 16 has a depth gradually reducing from the speaker compartment 16P toward an opening of the high-tone guide path 16H opposite to the speaker compartment 16P. That is, the speaker compartment 16P has a larger depth than that at the other portions of the resonant cabinet 16. The depth of the resonant cabinet 16 begins to reduce from a base portion of the high-tone guide path 16H adjacent to and communicating with the speaker compartment 16P and becomes smallest at the open end of the path 16H. Since the two partitions 161 and 162 defining the high-tone guide path 16H splay from the base portion thereof toward the open end thereof, the high-tone guide path 16H has a height gradually increased from the base portion toward the open end. Partitions 163 and 164 define the speaker compartment 16P.

Retaining rods 166, 167 are respectively attached to a side of the partitions 163, 164 facing the speaker compartment 16P, forming two clearances between the partitions 163, 164 and the retaining rods 166, 167, respectively, for clamping the speaker 21 thereto without needing other tools to install the speaker in the speaker compartment. The low-tone guide path 16L is formed at one inner side of the box member 16B of the resonant cabinet 16 and is communicable with the speaker compartment 16P. Shock-absorbing arms 171 and 172 are provided to extend from two outer side walls of the resonant cabinet 16. The shock-absorbing arms 171, 172 each has a free end on which a locking hole 171A or 172A is formed so that fastening means, may be threaded therethrough to fix the shock-absorbing arms 171, 172 to locking rod 19, 20 provided at the front frame 3 of the monitor 2.

Figure 3:
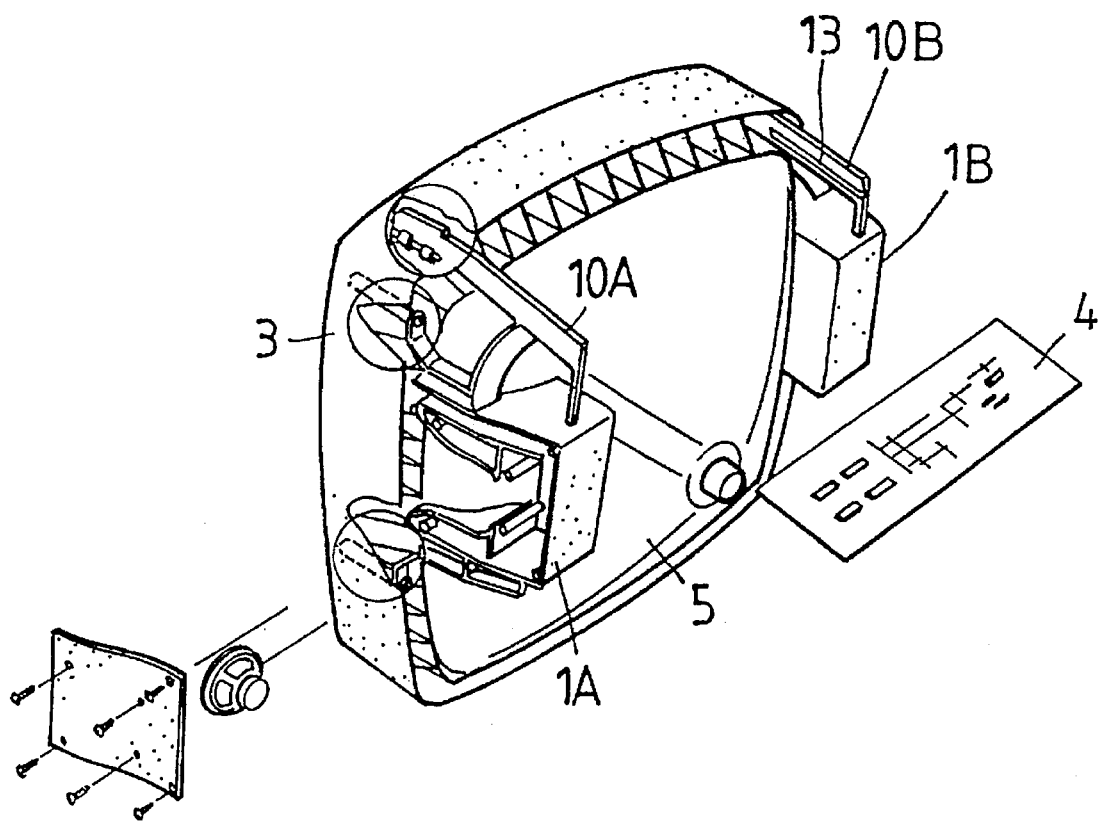
FIG. 3 illustrates the mounting of a complete set of the present invention to a backside of the computer monitor.
Figure 3A:
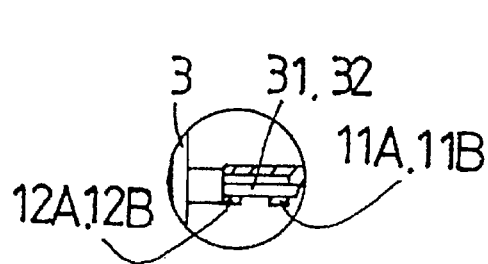
FIGS. 3A and 3B are enlarged views of a portion of the cut away part shown in FIG. 3.
Figure 3B:
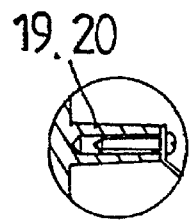

As shown in FIG. 3, when the front frame 3 and the rear housing 6 of the monitor 2 are connected to each other, the right and the left frameworks 1A and 1B are fixed to the back side of the front frame 3 by engaging the first and the second sleeve members 11A, 12A and 11B, 12B of their fixing arms 10A and 10B, respectively, with the fixing pins 31, 32 provided at two back lower or upper corners of the front frame 3. A distance left between the two fixing arms 10A, 10B plus the depth of the two grooves 13 formed on the inner sides of the fixing arms 10A, 10B shall be equal to the width of the system board 4, allowing two lateral edges of the system board 4 to be supported on and slidable along the grooves 13 so that the system board 4 is held between the two fixing arms 10A and 10B. In addition to the engagement of the first and the second sleeve members 11A, 12A and 11B, 12B with the fixing pins 31 and 32, respectively, the locking of the shock-absorbing arms 171, 172 to the locking rods 19, 20 of the front frame 3, respectively, shall further ensure the firm connection of the whole frameworks 1A, 1B to the front frame 3 of the monitor 2.

Figure 4:
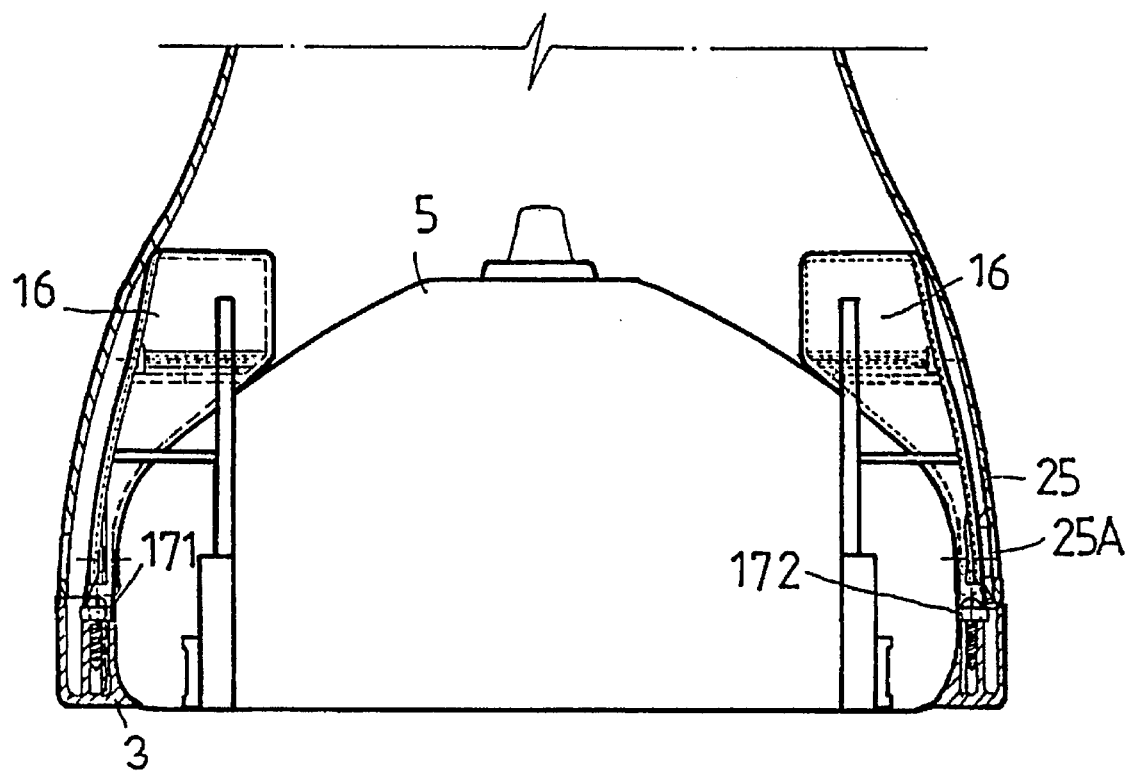
FIG. 4 is a cross sectional top view showing the mounting position of a complete set of the present invention in a computer monitor.

FIG. 4 is a cross section showing an assembled monitor with two frameworks 1A, 1B of the audio transmission device of the present invention mounted behind the front frame 3. From the figure, it can be clearly seen that the resonant cabinets 16 have an exterior curve which fitly contacts with a curved inner wall of the rear housing 6 and a curved outer surface of the display tube 5, permitting the resonant cabinets 16 to fitly clamp two sides of the display tube 5. With these fitly contact of the resonant cabinets 16 with the display tube 5 and the rear housing 6, the whole frameworks 1A and 1B can be firmly and stably mounted in the monitor 2. At side portions 25 of the rear housing 6 directly behind the front frame 3 to face the high-tone and low-tone guide paths 16H and 16L, sound holes 25A are formed for sounds to emit therefrom.

The shock-absorbing arms 171, 172 extended from the outer side walls of the resonant cabinets 16 can absorb vibrations of the monitor 2 caused by external forces applied on the monitor 2 and thereby facilitates a stable display and reduces possible noises.

With the above arrangements, the present invention has the advantages of reducing unstable display caused by any impact on the monitor and associating the monitor with the speakers and the system board, while it can effectively eliminate the disadvantages existed in the conventional monitor with externally connected speakers.

The above description and accompanying drawings are only used to illustrate a preferred embodiment of the present invention, not intended to limit the scope thereof. Many changes and modifications of the embodiment can be made without departing from the spirit of the present invention.

What is claimed is:

1. An audio transmission device for mounting in a monitor of a computer system, comprising a pair of symmetric frameworks mounted behind a front frame of said monitor at two lower or upper corners thereof so that a distance left between said pair of frameworks is about a width of a system board disposed inside said monitor, said frameworks each further comprising a fixing arm being formed at an inner side with a longitudinal groove which has a width slightly larger than a thickness of said system board to clamp said system board between said pair of frameworks, a connecting arm extended from one side of said fixing arm, a resonant cabinet connected to said fixing arm via said connecting arm, and shock-absorbing arms extended from two side walls of said resonant cabinet for locking to said front frame of said monitor, said resonant cabinet being partitioned inside it to form a high-tone and a low-tone guide paths, said high-tone guide path being formed at a base portion with supporting grooves for a speaker to mount thereon, and said fixing arm each being provided at an extended end with locating means to engage with a fixed point provided behind said front frame of said monitor and thereby fixing said framework to said front frame.

2. An audio transmission device for mounting in a monitor of a computer system as claimed in claim 1, wherein said resonant cabinet each is divided by partitions into a speaker compartment, a high-tone guide path, and a low-tone guide path; said resonant cabinet having a depth gradually reduced from said base portion of said high-tone guide path adjacent to said speaker compartment toward an open end of said high-tone guide path opposite to said speaker compartment, and thereby said speaker compartment having a depth bigger than that at other portions of said resonant cabinet.

3. An audio transmission device for mounting in a monitor of a computer system as claimed in claim 2, wherein two of said partitions defining said speaker compartment are separately provided at one side facing said speaker compartment with a retaining rod, such that clearances are left between said retaining rods and said partitions to receive and firmly clamp said speaker therebetween without needing other tools for installing said speaker to said speaker compartment.

4. An audio transmission device for mounting in a monitor of a computer system as claimed in claim 2 or 3, wherein said high-tone guide path of said resonant cabinet is in alignment with and communicable with said speaker compartment and has a configuration splaying from said base portion toward said open end thereof, and said low-tone guide path being located at one inner side of one of said side walls of said resonant cabinet and being communicable with said speaker compartment.

* * * * *